United States Patent [19]

Tung

[11] Patent Number: 4,833,174

[45] Date of Patent: May 23, 1989

[54] WOOD-LIKE POLYMERIC COMPOSITION

[75] Inventor: William C. T. Tung, Tallmadge, Ohio

[73] Assignee: The Goodyear Tire & Rubber Company, Akron, Ohio

[21] Appl. No.: 272,584

[22] Filed: Nov. 17, 1988

Related U.S. Application Data

[62] Division of Ser. No. 160,470, Feb. 25, 1988, Pat. No. 4,780,483.

[51] Int. Cl.$^4$ ................................................ C08J 9/10
[52] U.S. Cl. ........................................ 521/81; 521/79; 521/138; 521/180; 521/182; 521/82
[58] Field of Search ................. 521/81, 180, 182, 138, 521/79

[56] References Cited

U.S. PATENT DOCUMENTS 4,174,432  11/1979  Niznik ................................. 521/180
4,683,247  7/1987  Allen et al. ......................... 521/180

*Primary Examiner*—Morton Foelak

*Attorney, Agent, or Firm*—Alvin T. Rockhill

[57] ABSTRACT

The labor costs associated with manufacturing wooden articles often represent a substantial portion of the total cost of producing the wooden article. This invention discloses a polymeric composition which can be easily molded into articles which have physical properties which are very similar to those of wood. By utilizing the polymeric composition and techniques of this invention, it is possible to manufacture a wide variety of wood-like articles by molding at reduced costs. This invention specifically reveals a polymeric composition which can be molded into articles having wood-like physical properties which is comprised of (1) from about 80 to about 99 weight percent polyethylene terephthalate, (2) from about 1 to about 20 weight percent of a polycarbonate, and (3) from about 0.3 to about 2 weight percent of 5-phenyltetrazole. These polymeric compositions can be prepared utilizing scrap polyethylene terephthalate, such as recycled polyethylene terephthalate beverage bottles.

20 Claims, No Drawings

WOOD-LIKE POLYMERIC COMPOSITION

This is a Divisional of Application Ser. No. 160,470, filed on Feb. 25, 1988, now U.S. Pat. No. 4,780,483.

BACKGROUND OF THE INVENTION

Labor is frequently a major cost associated with manufacturing wooden articles, such as moldings, shutters, picture frames, hangers, window sills and the like. Nevertheless, wood is commonly used in making such articles because of its aesthetic beauty and physical properties. Various plastics could be easily molded into such articles. However, such plastic articles typically lack many of the desired physical properties of wood. For this reason moldable plastics have not been a satisfactory substitute for wood in manufacturing many types of articles wherein the physical properties of wood is desired.

Billions of polyethylene terephthalate (PET) bottles containing a wide variety of carbonated beverages are being sold to consumers. This results in hundreds of millions of pounds of PET bottles which must be disposed of annually. For environmental and economic reasons, it would be highly desirable to find additional uses for this vast amount of scrap PET beverage bottles. For example, it would be highly desirable to recycle scrap PET into useful products.

SUMMARY OF THE INVENTION

The subject invention discloses a polymeric composition which can be molded into articles which have physical properties which are similar to those of wood. These wood-like articles can be drilled, sawed, nailed, and planed in a manner similar to wood. These molded polymeric articles also accept screws like wood. Additionally, pigments or colorants can be added to the polymeric composition in order to provide the desired color characteristics. In fact, suitable pigments can be added to the polymeric composition so to make articles made therefrom look like wood.

The polymeric compositions made in accordance with this invention are comprised of polyethylene terephthalate, a polycarbonate, and 5-phenyltetrazole. The polyethylene terephthalate utilized in these polymeric compositions can be recycled polyethylene terephthalate, such as scrap PET beverage bottles.

This invention specifically discloses a polymeric composition which can be molded into articles having wood-like physical properties which is comprised of (1) from about 80 to about 99 weight percent polyethylene terephthalate, and (2) from about 1 to about 20 weight percent of a polycarbonate, and (3) from about 0.3 to about 2 weight percent of 5-phenyltetrazole.

This invention also reveals a process for preparing articles having wood-like physical properties which comprises (1) whipping a sufficient amount of an inert gas into a blend of polyethylene terephthalate and a polycarbonate to result in the formation of a low density blend having a density which is in the range of about 0.5 to about 0.8, wherein the blend is comprised of about 80 to about 99 weight percent polyethylene terephthalate and from about 1 to about 20 weight percent polycarbonate; and (2) molding the low density blend into an article having wood-like properties.

This invention further discloses a polymeric composition which can be molded into articles having wood-like physical properties which is comprised of (1) from about 80 to about 99 weight percent polyethylene terephthalate, (2) from about 1 to about 20 weight percent of a polycarbonate, and (3) from about 0.3 to about 2 weight percent of a foaming agent which has a decomposition temperature which is within the range of about 205° C. to about 320° C.

DETAILED DESCRIPTION OF THE INVENTION

The polymeric compositions of this invention can be made by simply mixing the PET, the polycarbonate, and the 5-phenyltetrazole. These polymeric compositions are simply an admixture of the PET, the polycarbonate and the 5-phenyltetrazole. The three components utilized in preparing the polymeric composition can be mixed utilizing any technique which results in an essentially homogeneous blend. It is not necessary to melt blend the three compounds to attain satisfactory results.

The polymeric compositions of this invention generally contain from about 80 to about 99 weight percent PET, from about 1 to about 20 weight percent polycarbonate and from about 0.3 to about 2 weight percent 5-phenyltetrazole. It is generally preferred for the polymeric composition to contain from about 88 weight percent to about 96 weight percent PET, from about 4 weight percent to about 12 weight percent polycarbonate and from about 0.4 weight percent to about 1 weight percent 5-phenyltetrazole. It is normally more preferred for the polymeric composition to contain from about 0.5 to about 0.8 weight percent 5-phenyltetrazole. These weight percentages are based upon the total weight of the polymeric composition. Colorants, pigments, antidegradants and other desired additives can also be added to the polymeric composition.

The PET utilized will normally have an intrinsic viscosity of at least 0.5 dl/g as measured in a 60/40 phenol/tetrachlorethane solvent system at 30° C. For practical reasons the PET will normally have an intrinsic viscosity which is within the range of about 0.65 dl/g to about 2.0 dl/g. For practical reasons, the PET utilized will most frequently have an intrinsic viscosity which is within the range of 0.7 dl/g to about 1.2 dl/g. Suitable PET resin is commercially available from a variety of sources. For example, Cleartuf®7202, Cleartuf®8502, and Cleartuf®1002, which have intrinsic viscosities of 0.72 dl/g, 0.85 dl/g, and 1.04 dl/g, respectively, can be utilized in the polymeric compositions of this invention. Recycled PET which has been recovered from scrap PET beverage bottles or other sources can also be utilized in preparing such polymeric compositions.

The polycaronbates utilized in the polymeric compositions of this invention are a well-recognized class of polymers, referred to as "aromatic polyesters of carbonate acid" by H. Schnell in his article in Angewandte Chemie, Vol. 68, No. 20, pp. 633–660, Oct. 21, 1956, and subsequently designated more simply by the term "aromatic polycarbonates" in the book by the same author entitled "Chemistry and Physics of Polycarbonates", Interscience Publishers, New York (1964). This book is incorporated herein by reference in order to avoid undue repetition as to the manner in which the polycarbonates are prepared, their physical and chemical properties and other detailed information concerning these polymers and their precursors.

For purposes of the present invention, it is especially desirable to employ the aromatic polycarbonates which can be designated as the linear condensation products of carbonic acid with a 4,4'-dihydroxy-diphenyl-alkane, a 4,4'-dihydroxy-triphenyl-alkane or a 4,4'-dihydroxy-diphenyl-cycloalkane in which the bridging group between the hydroxy-substituted phenyl nuclei contains at least 2 up to about 9 carbon atoms which is free of aliphatic unsaturation. More particularly, the preferred aromatic polycarbonates are those linear polymers defined by the repeating or recurring structural unit of the formula:

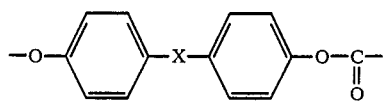

wherein X is a divalent hydrocarbon radical with a total of 2 up to about 9 carbon atoms selected from the group consisting of:

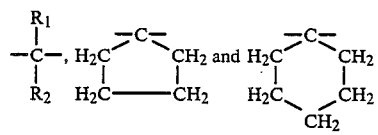

in which $R_1$ represents a member selected from the group consisting of hydrogen and lower alkyl groups, such as methyl, ethyl or propyl, and $R_2$ represents a member selected from the group consisting of phenyl group and alkyl groups containing 1 to 7 carbon atoms. These aromatic polycarbonates can be obtained with molecular weights from about 18,000 up to 500,000 or more, but for purposes of the present invention, it is desirable to use those polycarbonates having an average molecular weight falling between about 20,000 and about 250,000 and preferably between about 25,000 and about 150,000.

For reasons of economy and availability, it is particularly useful to practice the present invention with the aromatic polycarbonate obtained from 4,4'-dihydroxy-diphenyl-2,2-propane, more commonly referred to as "bisphenol A" and illustrated by the following formula:

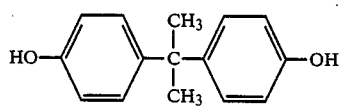

However, good results may also be achieved with the polycarbonate derived from 4,4'-dihydroxy-diphenyl-methyl-phenyl-methane having the formula:

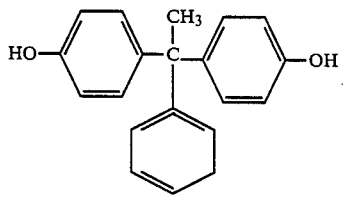

Other suitable aromatic polycarbonates for the purposes of this invention include those derived as the carbonate acid esters of the following dihydroxy aromatic compounds:

4,4'-dihydroxy-diphenyl-1,1-ethane,
4,4'-dihydroxy-diphenyl-1,1-butane,
4,4'-dihydroxy-diphenyl-1,1-isobutane,
4,4'-dihydroxy-diphenyl-1,1-cyclopentane,
4,4'-dihydroxy-diphenyl-1,1-cyclohexane,
4,4'-dihydroxy-diphenyl-phenyl-methane,
4,4'-dihydroxy-diphenyl-2,2-butane,
4,4'-dihydroxy-diphenyl-2,2-pentane,
4,4'-dihydroxy-diphenyl-2,2-hexane,
4,4'-dihydroxy-diphenyl-2,2-isohexane,
4,4'-dihydroxy-diphenyl-2,2-heptane,
4,4'-dihydroxy-diphenyl-2,2-octane,
4,4'-dihydroxy-diphenyl-2,2-nonane,
4,4'-dihydroxy-diphenyl-ethyl-phenyl-methane,
4,4'-dihydroxy-diphenyl-3,3-pentane, and
4,4'-dihydroxy-diphenyl-4,4-heptane.

The polycarbonates of these compounds, i.e., the carbonic acid polyesters prepared therefrom, can be named by attaching the prefix "poly" and the suffix "-carbonate" to the name of the particular aromatic compound. All of the aromatic polycarbonates are closely related in terms of molecular structure and chemical properties with only a few exceptions, even when the phenyl nuclei are further substituted by lower alkyl groups, halogen atoms, methoxy groups and the like or when copolymers are formed from different aromatic dihydroxy compounds.

The 5-phenyltetrazole utilized in the polymeric composition acts as a high temperature foaming agent. 5-phenyltetrazole has the following structural formula:

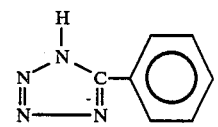

It is believed that foaming agents other than 5-phenyltetrazole which have decomposition temperatures within the range of 205° C. to 320° C. can also be used.

After the polymeric composition is prepared, it can be molded utilizing conventional techniques. For instance, the polymeric composition can be injection molded or extruded into a wide variety of manufactured articles having physical properties which are very similar to those of wood. This molding process will typically be carried out at a temperature which is within the range of about 200° C. to about 300° C. It will normally be preferred for the molding or extruding process to be conducted at a temperature which is within the range of 210° C. to 270° C. It will generally be most preferred for the molding or extruding to be carried out at a temperature which is within the range of about 220° C. to about 260° C. The 5-phenyltetrazole will foam or blow the polymeric composition at the elevated molding temperature. This results in the wood-like article being produced having a density which is within the range of about 0.5 to about 0.8. In order to attain physical properties which most closely simulate those of wood, it will be preferred for the wood-like article being prepared to have a density which is within the range of about 0.6 to about 0.7. The density of the wood-like article being produced can be controlled by varying the amount of 5-phenyltetrazole utilized in the polymeric composition.

In an alternative embodiment of the present invention, articles having wood-like physical properties can be prepared utilizing blends of PET and a polycarbonate without utilizing 5-phenyltetrazole as a foaming agent. In this alternative procedure, a blend containing about 80 to about 99 weight percent PET and about 1 to about 20 weight percent polycarbonate is initially prepared. It is preferred for this blend to contain from about 88 weight percent to about 96 weight percent PET and from about 4 weight percent to about 12 weight percent polycarbonate, based upon the total weight of the PET/polycarbonate mixture. The PET/polycarbonate mixture is then heated to a temperature above the melting point of the blend, which will typically be within the range of about 200° C. to about 300° C., and then an inert gas is whipped into the molten blend. A sufficient amount of inert gas will be whipped into the molten blend to result in it having a density which is within the range of about 0.5 to about 0.8. It will normally be preferred for a sufficient amount of inert gas to be whipped into the blend to produce a density which is within the range of about 0.6 to about 0.7. The low density blend produced by whipping the inert gas into the mixture of PET and polycarbonate is then immediately molded or extruded into the article desired. The molding or extruding process is carried out before the inert gas has time to escape from the low density blend in order for the article being produced to have a density within the desired range. The inert gas utilized in this technique can be a noble gas or nitrogen. The inert gas will typically be nitrogen in commercial operations. However, in some cases it will be suitable to utilize air as the inert gas.

The techniques of this invention are of greatest value in preparing articles which have intricate designs which can be injection molded or extruded. For example, the molding compositions of this invention are of particular value in manufacturing moldings, shutters, picture frames, hangers, and window sills. By utilizing the polymeric composition and techniques of this invention, such articles can be prepared which have physical properties very are very similar to those of wood. Accordingly, such articles can be drilled, sawed, and planed in a manner very similar to wood. Additionally, such articles will accept screws and nails like wood. However, such articles offer a significant advantage over real wooden articles in that they will not rot or decay even under severe environmental conditions.

The present invention will be described in more detail in the following examples. These examples are merely for the purpose of illustration and are not to be regarded as limiting the scope of the invention or the manner in which it can be practiced. Unless specifically indicated otherwise, all parts and percentages are given by weight.

EXAMPLE 1

In this experiment a composition having properties very similar to those of wood was prepared by injection molding. A polymeric composition was prepared by blending 0.895 parts of polyethylene terephthalate having an intrinsic viscosity of 0.7 with 0.1 parts of polycarbonate and 0.005 parts of 5-phenyltetrazole. The polymeric composition prepared was made by simply dry blending the three components. The polymeric composition was then injection molded into a 5"×1.75"×0.625" (12.7 cm×4.45 cm×1.59 cm) mold. This molding was done utilizing a cylinder temperature of about 243° C., a nozzle temperature of about 260° C., a mold temperature of about 16° C., an injection cycle time of about 60 seconds, and a mold closed cycle time of about 60 seconds.

The article produce was a strong wood-like solid having a specific gravity of about 0.63. The article could be sawed or drilled and accepted nails and screws as readily as natural wood. Thus, the article made had all of the most desirable physical characteristics of wood.

COMPARATIVE EXAMPLE 2

In this experiment, the procedure utilized in Example 1 was repeated except that the 5-phenyltetrazole was not included in the polymeric composition. In this experiment, the article produced by injection molding was grossly unacceptable and inferior. This article made without using 5-phenyltetrazole certainly did not have physical properties which simulate those of natural wood. This example shows that a simple blend of PET and polycarbonate cannot be utilized in making molded articles having wood-like physical properties in the absence of 5-phenyltetrazole.

U.S. Pat. No. 3,470,114 discloses a process for producing a foamed polyester, such as polyethylene terephthalate, by reacting a homogeneous mixture of the polyester with an aromatic polycarbonate. However, U.S. Pat. No. 3,470,114 does not disclose the utilization of blowing agents, such as 5-phenyltetrazole, in making such foamed polyesters. This example shows that such foamed polyesters which are made without using 5-phenyltetrazole as a blowing agent do not have physical properties which simulate those of natural wood.

COMPARATIVE EXAMPLE 3

In this experiment the procedure utilized in Example 1 was repeated except that the polycarbonate was not included in the polymeric composition. In this experiment the polymeric composition lacking the polycarbonate could not be properly injection molded. The articles produced did not have the correct dimensions and were of highly irregular shape. In fact, the articles made utilizing this technique contained uneven voids which were probably the result of collapsed cells. Thus, this example clearly shows that it is necessary to utilize a polycarbonate in the molding composition.

British Pat. No. 1,570,320 discloses an additive composition which is comprised of a chemical blowing agent, such as 5-phenyltetrazole, and a saturated polyester having a crystalline melting point of from 100° to 220° C. and a reduced viscosity of from 0.4 to 1.6 dl/g, such as PET. However, British Pat. No. 1,570,320 does not disclose the utilization of a polycarbonate in such compositions. This example shows that such compositions which do not contain a polycarbonate are highly inferior for use in molding articles which have wood-like physical properties.

While certain representative embodiments have been shown for the purpose of illustrating this invention, it will be apparent to those skilled in this art that various changes and modifications can be made therein without departing from the scope of this invention.

What is claimed is:

1. A process for preparing articles having wood-like physical properties which comprises (1) whipping a sufficient amount of an inert gas into a blend of polyethylene terephthalate and a polycarbonate to result in the formation of a low density blend having a density which is in the range of about 0.5 to about 0.8, wherein the blend is comprised of from about 88 to about 96 weight percent polyethylene terephthalate and from about 4 to about 12 weight percent polycarbonate; wherein said polycarbonate was prepared utilizing a member selected from the group consisting of 4,4'-dihydroxy-diphenyl-2,2-propane, 4,4'-dihydroxy-diphenyl-methyl-phenyl-methane, 4,4'-dihydroxy-diphenyl-1,1-ethane, 4,4'-dihydroxy-diphenyl-1,1-butane, 4,4'-dihydroxy-diphenyl-1,1-isobutane, 4,4'-dihydroxy-diphenyl-1,1-cyclopentane, 4,4'-dihydroxy-diphenyl-1,1-cyclohexane, 4,4'-dihydroxy-diphenyl-phenyl-methane, 4,4'-dihydroxy-diphenyl-2,2-butane, 4,4'-dihydroxy-diphenyl-2,2-pentane, 4,4'-dihydroxy-diphenyl-2,2-hexane, 4,4'-dihydroxy-diphenyl-2,2-isohexane, 4,4'-dihydroxy-diphenyl-2,2-heptane, 4,4'-dihydroxy-diphenyl-2,2-octane, 4,4'-dihydroxy-diphenyl-2,2-nonane, 4,4'-dihydroxy-diphenyl-3,3-pentane, and 4,4'-dihydroxy-diphenyl-4,4-heptane and (2) molding the low density blend into an article having wood-like properties.

2. A process for preparing articles having wood-like physical properties which comprises (1) whipping a sufficient amount of an inert gas into a blend of polyethylene terephthalate and a polycarbonate to result in the formation of a low density blend having a density which is in the range of about 0.5 to about 0.8, wherein the blend is comprised of from about 88 to about 96 weight percent polyethylene terephthalate and from about 4 to about 12 weight percent polycarbonate; wherein said polycarbonate was prepared utilizing a member selected from the group consisting of 4,4'-dihydroxy-diphenyl-2,2-propane, 4,4'-dihydroxy-diphenyl-methyl-phenyl-methane, 4,4'-dihydroxy-diphenyl-1,1-ethane, 4,4'-dihydroxy-diphenyl-1,1-butane, 4,4'-dihydroxy-diphenyl-1,1-isobutane, 4,4'-dihydroxy-diphenyl-1,1-cyclopentane, 4,4'-dihydroxy-diphenyl-1,1-cyclohexane, 4,4'-dihydroxy-diphenyl-phenyl-methane, 4,4'-dihydroxy-diphenyl-2,2-butane, 4,4'dihydroxy-diphenyl-2,2-pentane, 4,4'-dihydroxy-diphenyl-2,2-hexane, 4,4'-dihydroxy-diphenyl-2,2-isohexane, 4,4'-dihydroxy-diphenyl-2,2-heptane, 4,4'-dihydroxy-diphenyl-2,2-octane, 4,4'-dihydroxy-diphenyl-2,2-nonane, 4,4'-dihydroxy-diphenyl-3,3-pentane, and 4,4'hydroxy-diphenyl-4,4-heptane and (2) extruding the low density blend into an article having wood-like properties.

3. An article having wood-like physical properties made by the process specified in claim 1.

4. An article having wood-like physical properties made by the process specified in claim 2.

5. A process as specified in claim 1 wherein the inert gas is whipped into the blend of polyethylene terephthalate and polycarbonate at a temperature which is within the range of about 200° C. to about 300° C.

6. A process as specified in claim 2 wherein the inert gas is whipped into the blend of polyethylene terephthalate and polycarbonate at a temperature which is within the range of about 200° C. to about 300° C.

7. A process as specified in claim 5 wherein the polyethylene terephthalate has an intrinsic viscosity which is within the range of about 0.65 dl/g to about 2.0 dl/g.

8. A process as specified in claim 6 wherein the polyethylene terephthalate has an intrinsic viscosity which is within the range of about 0.65 dl/g to about 2.0 dl/g.

9. A process as specified in claim 7 wherein the polycarbonate is prepared utilizing 4,4'-dihydroxy-diphenyl-2,2-propane.

10. A process as specified in claim 8 wherein the polycarbonate is prepared utilizing 4,4'-dihydroxy-diphenyl-2,2-propane.

11. A process as specified in claim 9 wherein the blend further comprises an antidegradant.

12. A process as specified in claim 10 wherein the blend further comprises an antidegradant.

13. A process as specified in claim 7 wherein said inert gas is nitrogen.

14. A process as specified in claim 8 wherein said inert gas is nitrogen.

15. A process as specified in claim 7 wherein the polycarbonate is prepared utilizing 4,4'-dihydroxy-diphenyl-methyl-phenyl-methane.

16. A process as specified in claim 8 wherein the polycarbonate is prepared utilizing 4,4'-dihydroxy-diphenyl-methyl-phenyl-methane.

17. A process as specified in claim 7 wherein said polycarbonate has a molecular weight which is within the range of about 18,000 to 500,000.

18. A process as specified in claim 9 wherein said polycarbonate has a molecular weight which is within the range of about 20,000 to about 200,000.

19. A process as specified in claim 18 wherein the polyethylene terephthalate has an intrinsic viscosity which is within the range of 0.7 dl/g to 1.2 dl/g.

20. A process as specified in claim 19 wherein said polycarbonate has a molecular weight which is within the range of about 25,000 to about 150,000.

* * * * *